United States Patent [19]

Ataka et al.

[11] 4,060,699

[45] Nov. 29, 1977

[54] LINE CONNECTION REVERSING CIRCUITS

[75] Inventors: Hisashi Ataka; Shigeo Wako; Shintaro Ushio, all of Tokyo, Japan

[73] Assignee: Oki Electric Industry Co., Ltd., Tokyo, Japan

[21] Appl. No.: 720,080

[22] Filed: Sept. 2, 1976

[30] Foreign Application Priority Data

Sept. 10, 1975  Japan .................................. 50-109015

[51] Int. Cl.² .............................................. H04Q 3/52
[52] U.S. Cl. ............................. 179/18 GF; 340/166 R
[58] Field of Search ..................... 179/18 GF, 18 GE; 340/166 R

[56] References Cited

U.S. PATENT DOCUMENTS

| 3,260,996 | 7/1966 | Müller | 340/166 R |
| 3,535,692 | 10/1970 | Papke | 340/166 R |
| 3,550,088 | 12/1970 | Jones | 340/166 R |
| 3,657,616 | 4/1972 | Mizushima et al. | 340/166 R |

Primary Examiner—Thomas A. Robinson
Attorney, Agent, or Firm—Wenderoth, Lind & Ponack

[57] ABSTRACT

In a line connection reversing circuit of the type having a first set of a plurality of paired transmission lines, and a second set of a plurality of paired transmission lines crossing the set of paired transmission lines to form a matrix, there are provided four bidirectional semiconductor switching elements at each crosspoint of the matrix. Each semiconductor switching element is connected between conductors of two paired transmission lines of the first and second sets. The four semiconductor switching elements are grouped into two pairs, and the two pairs are controlled oppositely.

3 Claims, 2 Drawing Figures

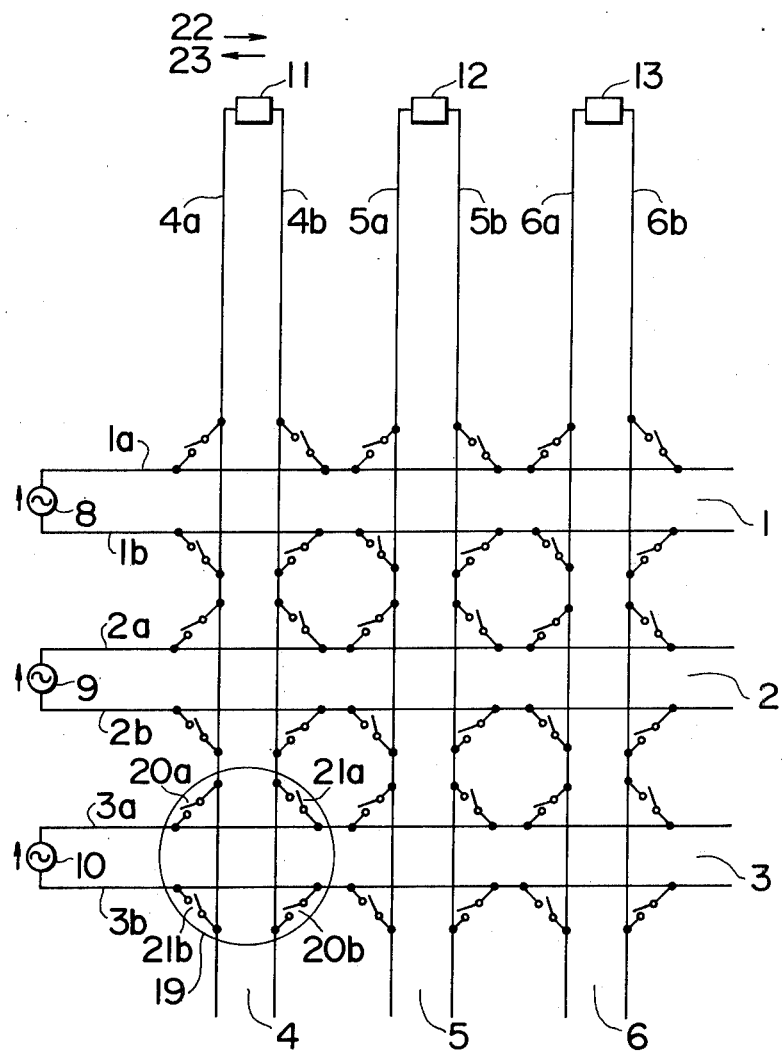

LINE CONNECTION REVERSING CIRCUITS

BACKGROUND OF THE INVENTION

This invention relates to a line connection reversing circuit utilizing semiconductor switches and more particularly to a line connection reversing circuit utilized to form a switching matrix installed in a telephone exchange processing audio, image signals or data.

To have better understanding of this invention a typical line connection reversing circuit or a line switching device utilized in a telephone exchange will first be described.

In this circuit, paired transmission circuits 1, 2 and 3 and another set of paired transmission circuits 4, 5 and 6 are arranged to cross each other and semiconductor switching elements are disposed at respective cross-points. Voltage sources 8, 9 and 10 are connected to paired transmission lines 1, 2 and 3 respectively and impedances 11, 12 and 13 are connected across paired transmission lines 4, 5 and 6, respectively. Conductors of respective paired transmission lines are designated by digits with suffixes a and b, for example 1a, 1b, 2a, 2b and so on. Any cross-point between two paired transmission lines as illustrated by a circle 7 is hereinafter termed a cross-point. Further, an arrangement of four switches or switching elements as illustrated by circle 14 is termed a line reversing switch. With this connection, in order to interconnect any one of paired transmission lines 1 to 3 and any one of paired transmission lines 4 to 6, it is necessary to close the switching elements at their cross-point and the corresponding reversing switch. Thus, to connect paired transmission lines 3 and 4 the switching elements at their cross-point 7 are closed and the switches 15a and 15b of the line reversing switch 14 are closed whereas switches 16a and 16b are opened. Then, the current from the voltage source 10 flows to the impedance 11 through the line reversing switch 14 and the switching elements at the cross-point 7. At this time, current flows through impedance 11 in the direction of arrow 17. Under these conditions when switches 15a and 15b of the line reversing switch 14 are opened and switches 16a and 16b are closed, current flows through the impedance in the direction of arrow 18. In this manner, in order to reverse the direction of current flowing through the impedance without reversing the polarity of the voltage source it is necessary to provide the line reversing switch 14. Moreover, in order to establish a through line it is necessary to control both switching elements at the cross-point and the line reversing switch. This arrangement not only requires a large number of switching elements but also requires a long time to establish a through line.

SUMMARY OF THE INVENTION

It is an object of this invention to provide a novel line connection reversing circuit capable of eliminating these disadvantages.

Another object of this invention is to provide a novel line connection reversing circuit which interconnects transmission line pairs while at the same time effecting line connection reversal.

Still another object of this invention is to provide a novel line connection reversing circuit capable of establishing a through line in a short time with a small insertion loss, and decreasing the burden of the control device for the circuit.

According to this invention, there is provided a line connection reversing circuit comprising a first set of a plurality of paired transmission lines, a second set of a plurality of paired transmission lines crossing the first set of paired transmission lines to form a matrix, each one of the transmission lines including two conductors, first and second pairs of bidirectional semiconductor switching elements disposed at each cross-point of the matrix, one bidirectional semiconductor switching element of the first pair being connected between the first conductor of one paired transmission line of the first set and the first conductor of one paired transmission line of the second set, the other bidirectional semiconductor switching element of the first pair being connected between the second conductor of the said paired transmission line of the first set and the second conductor of said paired transmission line of the second set, one bidirectional semiconductor switching element of the second pair being connected between said first conductor of said paired transmission line of said first set and the second conductor of said paired transmission line of the second set and the other bidirectional semiconductor switching element of the second pair being connected between said second conductor of said paired transmission line of the first set and said first conductor of said paired transmission line of said second set, and means for oppositely controlling the first and second pairs of the semiconductor switching elements.

BRIEF DESCRIPTION OF THE DRAWINGS

In the accompanying drawings:

FIG. 2 is a connection diagram showing one embodiment of this invention.

DESCRIPTION OF THE PREFERRED EMBODIMENT

Figure 1:
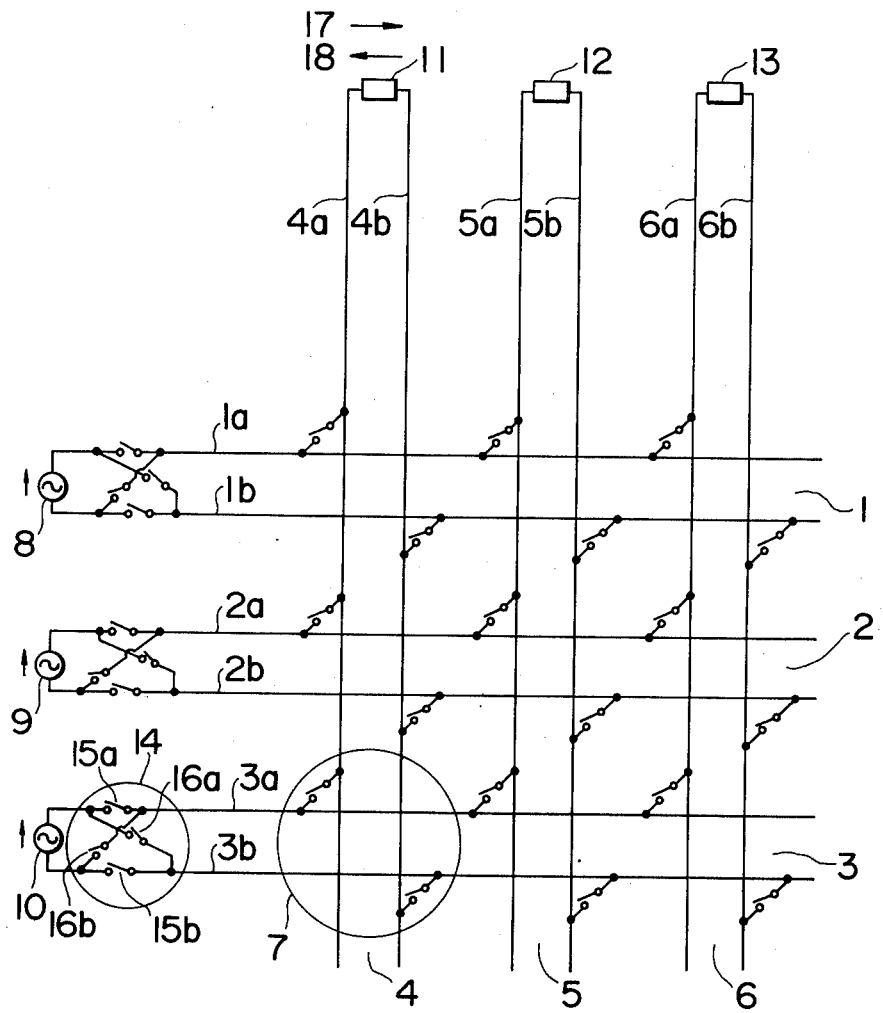
FIG. 1 is a circuit diagram showing a prior art line switching device.

A preferred embodiment shown in FIG. 2 comprises paired transmission lines 1 through 6 respectively comprising conductors 1a, 1b, . . . . 6a and 6b which cross each other to form a matrix. Voltage sources 8, 9 and 10 and impedances 11, 12 and 13 are connected in the same manner as in FIG. 1. In this embodiment, four bidirectional semiconductor switching elements 20a, 20b, 21a and 21b are connected as shown at each cross-point 19.

According to this invention, by the control of the four bidirectional semiconductor switching elements the connection of two transmission line pairs and line reversal are effected simultaneously. With particular reference to cross-point 19 between transmission line pairs 3 and 4, switches 20 and 21 are controlled oppositely. More particularly switches 20a and 20b are closed concurrently while switches 21a and 21b are opened, or switches 21a and 21b are closed concurrently while switches 20a and 20b are opened. Thus, the cross-point 19 has functions of both cross-point 7 and the line reversing switch 14 shown in FIG. 1.

When switches 20a and 20b of the cross-point 19 are closed to interconnect source 10 and impedance 11, current flows in the direction of arrow 22, whereas when switches 21a and 21b are closed, current flows in the direction of arrow 23. In this manner, it is possible to reverse the direction of flow of the current flowing through the impedance 11 by the selective closure of the switches at the cross-point.

When the circuit of this invention is fabricated by using a semiconductor integrated circuit the increase in the number of the switching elements i the cross-points does not present any serious problem. Further, since the switching elements in any cross-point act also as a line reverse, it is possible to connect lines by the address of the cross-point alone. Accordingly, it is possible to decrease the amount of soft ware required to drive the switching elements of an electronic telephone exchange system and to increase the processing speed of establishing a through lne. This decreases the burden of the central processing device thereby improving the service of the electronic telephone exchange system. Although in the embodiment shown in FIG. 2, the number of paired transmission lines arranged in a matrix is 3 × 3, it will be clear that the number of the paired transmission lines is not limited to this particular number.

In summary, the line connection reversing circuit has the following advantages.

1. Crosstalk at the cross-point can be reduced by the provision of switches 20b and 21b, because these switches balance the impedance between any two lines.

2. Since switches 20a, 20b and 21a, 21b, are operated oppositely, it is possible to reverse the current flowing through the impedance. This ability is especially necessary for a party line system and for the interchange of signals between offices.

3. Increase in the number of switching elements does not present any serious problem, because the circuit can be fabricated by using a semiconductor integrated circuit.

4. Since the switching elements at any cross-point also act as a line reverser, it is necessary to designate only a desired cross-point thereby decreasing the burden of the control device as well as the amount of soft ware in the case of program system.

5. Where independent line reversing switch and cross-point switch are used as shown in FIG. 1, the time required to establish a through line is equal to the sum of the operation times of these two switches. However, according to this invention, this time can be reduced to one half for the reason described above.

6. The insertion loss is also reduced to one half for the same reason.

What is claimed is:

1. A line connection reversing circuit comprising a first set of a plurality of paired transmission lines, a second set of a plurality of paired transmission lines crossing said first set of paired transmission lines to form a matrix, each one of said transmission lines including two conductors, first and second pairs of bidirectional semiconductor switching elements disposed at each cross-point of said matrix, one bidirectional semiconductor switching element of the first pair being connected between the first conductor of one paired transmission line of the first set and the first conductor of one paired transmission line of the second set, the other bidirectional semiconductor switching element of the first pair being connected between the second conductor of said paired transmission line of said first set and the second conductor of said paired transmission line of said second set, one bidirectional semiconductor switching element of the second pair being connected between said first conductor of said paired transmission line of said first set and said second conductor of said paired transmission line of said second set and the other bidirectional semiconductor switching element of the second pair being connected between said second conductor of said paired transmission line of the first set and said first conductor of said paired transmission line of said second set, and means electrically coupled to said first and second pairs of semiconductor switching elements for oppositely controlling said first and second pairs of said semiconductor switching elements.

2. The line connection reversing circuit according to claim 1 wherein each of the paired transmission lines of the first set is connected across a voltage source and each of the paired transmission lines of the second set is termined with an impedance.

3. The line connection reversing circuit according to claim 1 wherein said bidirectional semiconductor switching elements of the first and second pairs are fabricated as an integrated circuit.

* * * * *